Feb. 9, 1954   D. R. CORMANY   2,668,689
AUTOMATIC POWER TONGS
Filed Nov. 7, 1947   9 Sheets-Sheet 2
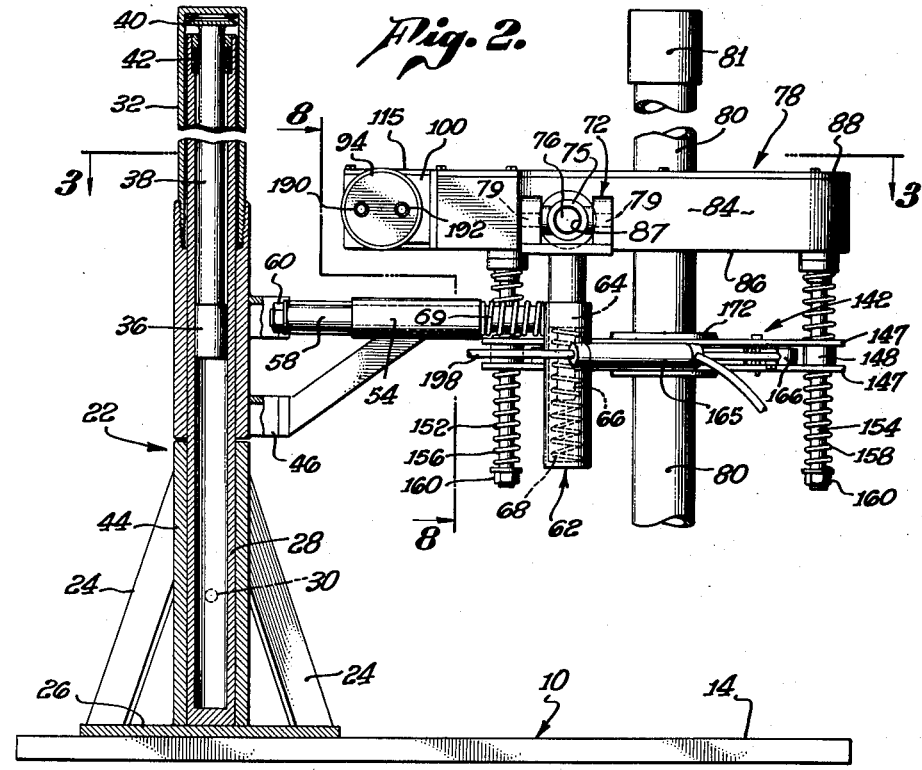
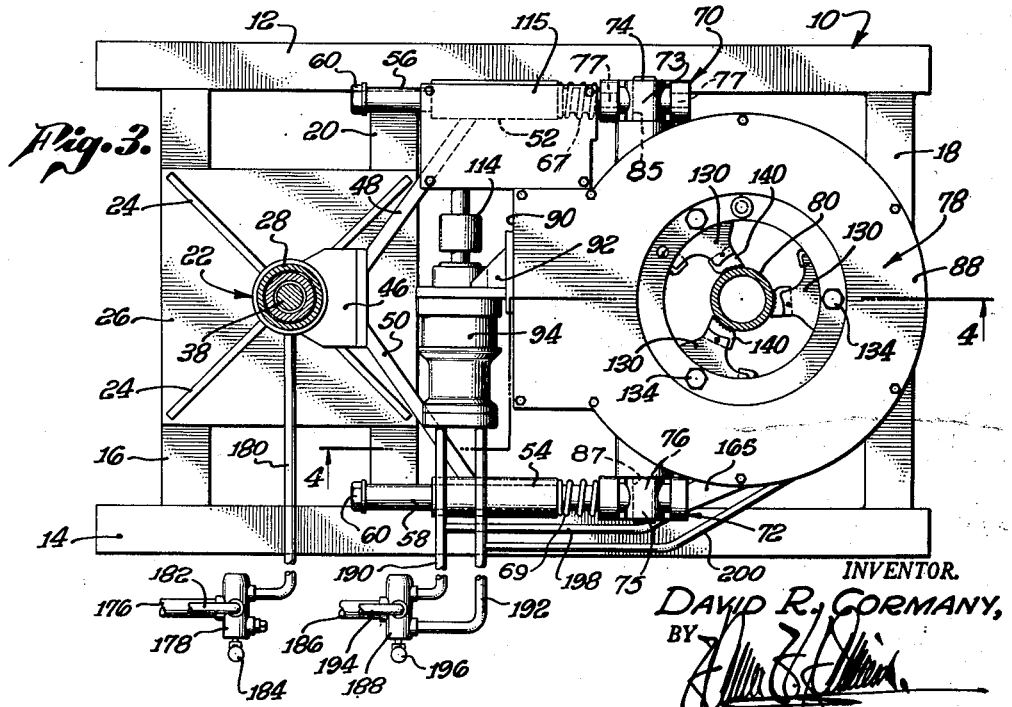
INVENTOR.
DAVID R. CORMANY,
BY
ATTORNEY.

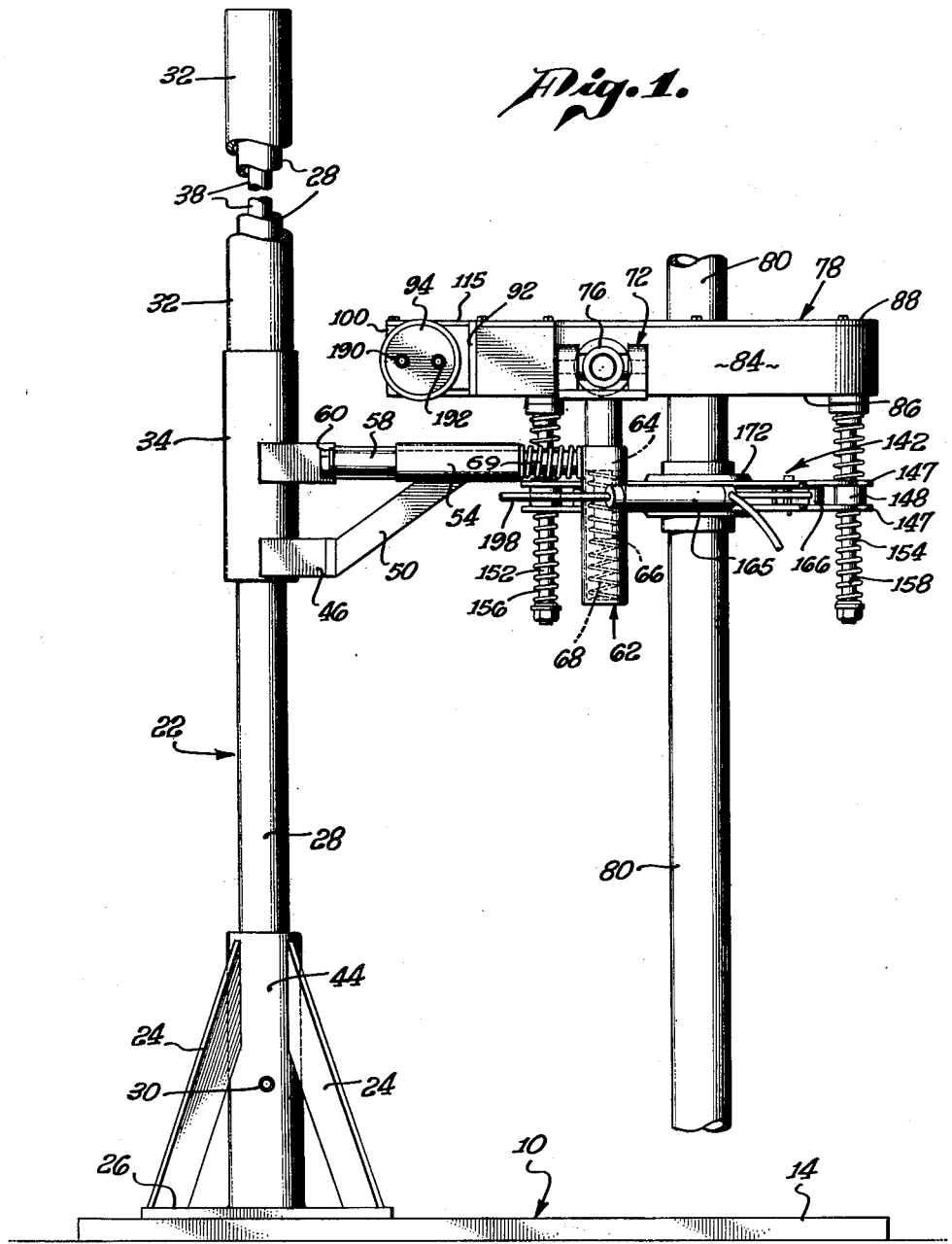

Feb. 9, 1954 D. R. CORMANY 2,668,689
AUTOMATIC POWER TONGS
Filed Nov. 7, 1947 9 Sheets-Sheet 3

INVENTOR.
DAVID R. CORMANY,
BY
ATTORNEY.

Feb. 9, 1954    D. R. CORMANY    2,668,689
AUTOMATIC POWER TONGS
Filed Nov. 7, 1947    9 Sheets-Sheet 4
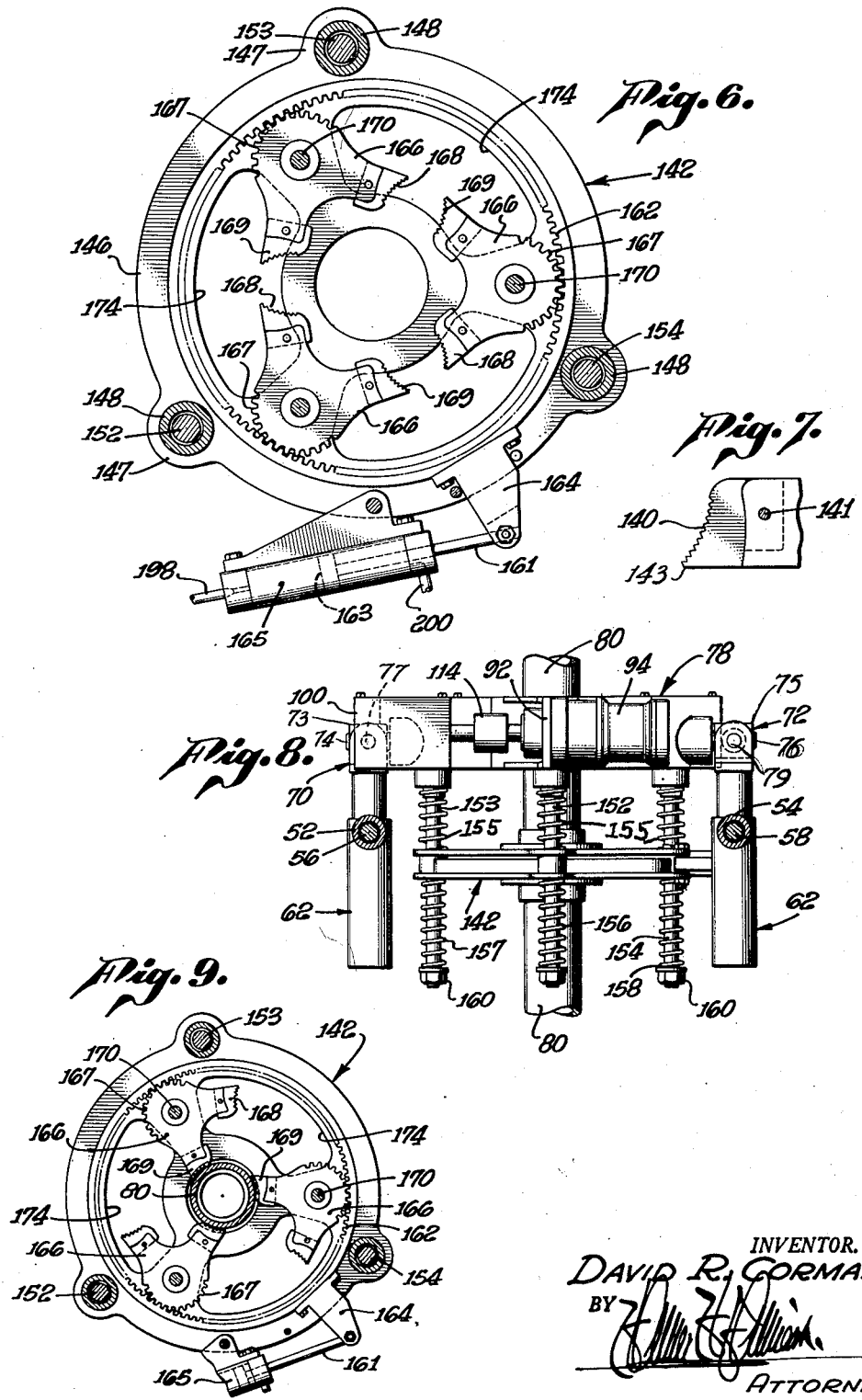
INVENTOR.
DAVID R. CORMANY,
BY
ATTORNEY.

Feb. 9, 1954      D. R. CORMANY      2,668,689
AUTOMATIC POWER TONGS

Filed Nov. 7, 1947      9 Sheets-Sheet 5

INVENTOR.
DAVID R. CORMANY,
BY
ATTORNEY

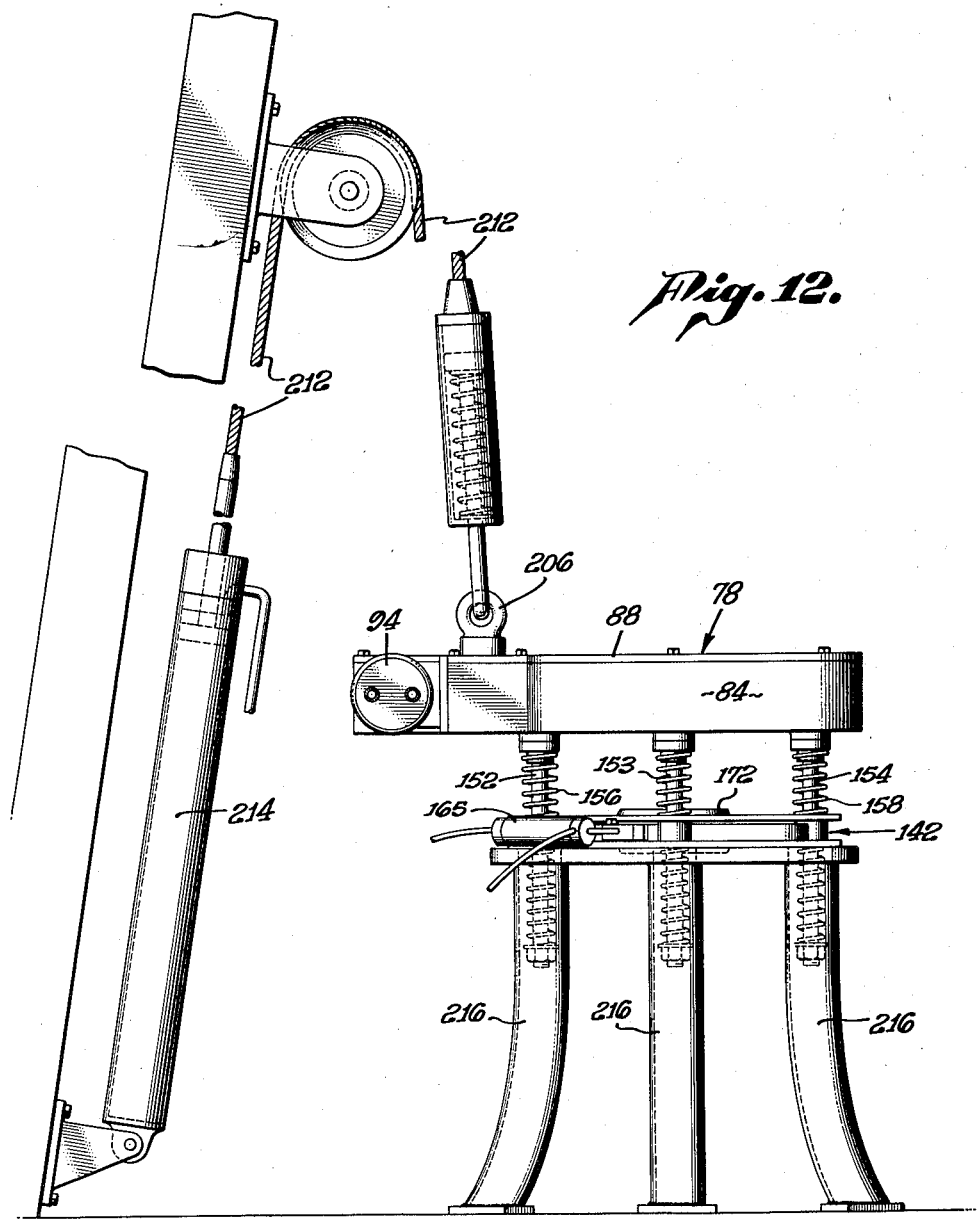

Feb. 9, 1954          D. R. CORMANY          2,668,689
AUTOMATIC POWER TONGS
Filed Nov. 7, 1947                          9 Sheets-Sheet 7
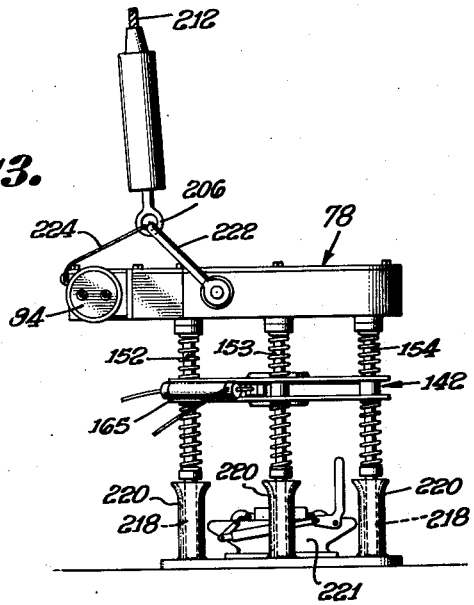
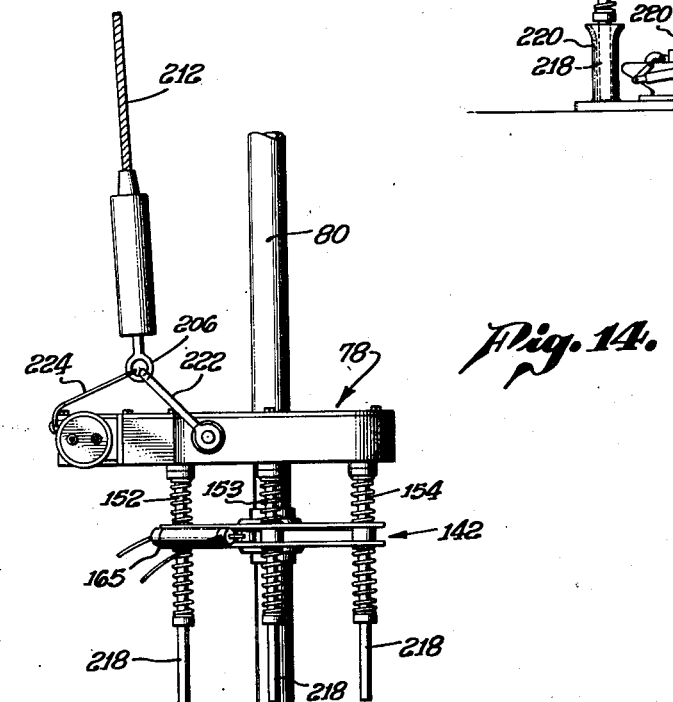
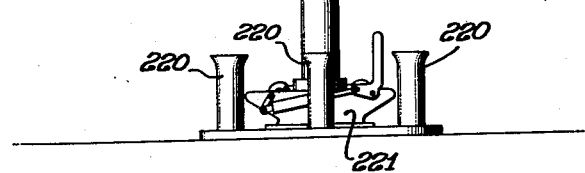

Feb. 9, 1954
D. R. CORMANY
2,668,689
AUTOMATIC POWER TONGS
Filed Nov. 7, 1947
9 Sheets-Sheet 8
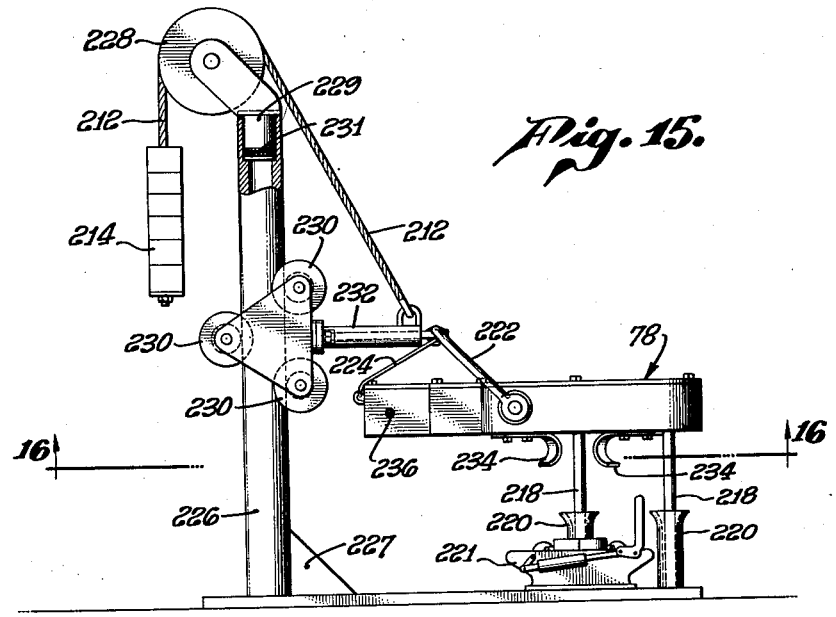
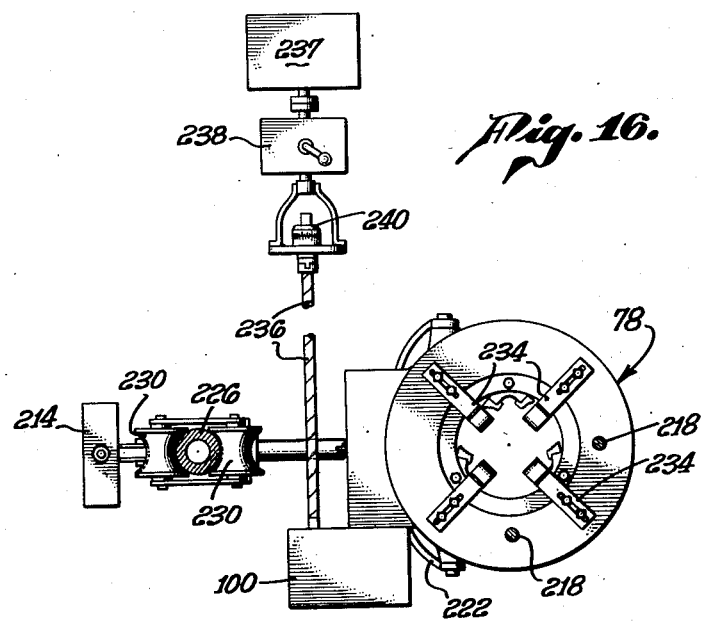
INVENTOR.
DAVID R. CORMANY,
BY
ATTORNEY.

Feb. 9, 1954   D. R. CORMANY   2,668,689
AUTOMATIC POWER TONGS
Filed Nov. 7, 1947   9 Sheets-Sheet 9
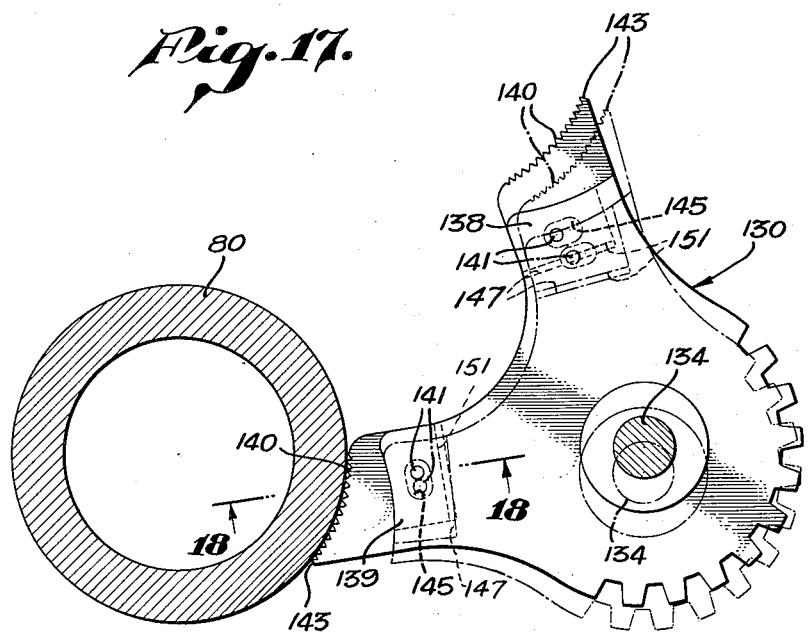
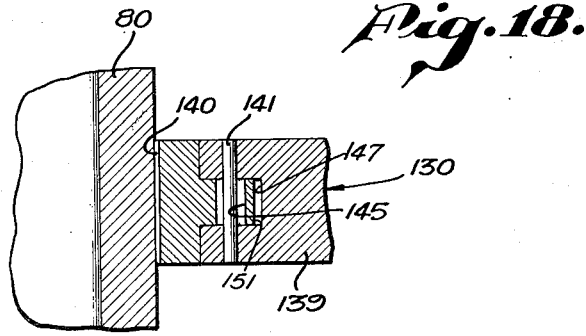
DAVID R. CORMANY,
INVENTOR.
BY
ATTORNEY Patented Feb. 9, 1954

2,668,689

UNITED STATES PATENT OFFICE 2,668,689

AUTOMATIC POWER TONGS

David R. Cormany, Long Beach, Calif., assignor to C & C Tool Corporation, Long Beach, Calif., a corporation of California Application November 7, 1947, Serial No. 784,556

13 Claims. (Cl. 255—35)

My invention relates to power operated tongs or a mechanically driven wrench assembly particularly adapted to assemble and disassemble strings of tubing, casing, liners, drill pipe and the like, such as is used, for example, in oil wells.

My power wrench is especially adapted for coupling and breaking up externally smooth, cylindrical pipe sections which thus lack tool engaging surfaces and it is also of particular utility in unscrewing joints in which the threads have become rusted tight or "frozen."

The invention provides two sets of circumferentially disposed gripping members, axially spaced apart along a common pipe-receiving aperture, one set being adapted to hold the pipe alternatively against rotation in either direction, while the other set is designed to both grip and turn the pipe alternatively in either direction and oppositely to the direction in which the first named set holds its part of the pipe, the two jaw assemblies being arranged to simultaneously move toward or away from each other axially as may be required for threading or unthreading an engaged pipe joint.

An important object of the invention is to provide a substantially self-operating assembly of the type described, which is of both simple and sturdy construction, and of easy and efficient operation.

Another purpose is the provision of a positive drive mechanism operable through one set of engaging jaws to rotate a pipe alternatively in either direction while another set of jaws holds an adjacent pipe section against rotation in the same direction. A unique feature of the invention resides in gripping jaws employing bifurcate engaging cams adapted selectively to bind a pipe for or against rotation in either direction.

Still another object is to provide a mounting structure for the wrench assembly described, by which the latter may be accurately located above a drill hole or the like and may be tilted in any direction as well, in order to align its axis with that of a slanted pipe which it is desired to grip.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification:

Figure 1 is a side elevational view of my adjustable power pipe wrench assembly in operative position;

Figure 2 is a side elevational view partly in section of my assembly shown in Fig. 1 in inoperative position ready to receive a pipe elevator under the coupling;

Figure 3 is a top plan view of my assembly as seen along the line 3—3 of Fig. 2, except the gripping elements are in the operative position for assemblying a string of pipe;

Figure 6 is a horizontal, sectional view of the lower pipe-engaging elements as seen along the line 6—6 in Fig. 4;

Figure 7 is a detail view of a pipe engaging die;

Figure 8 is an end elevational view of the assembly as seen along the line 8—8 of Fig. 2;

Figure 9 is a view similar to Fig. 6 showing the jaws in pipe gripping position;

Figure 12 is a side elevation of another alternative assembly of the assembly shown in Figure 2, especially applicable to portable derricks;

Figure 13 is a side elevational view of another alternative assembly of the assembly shown in Figure 2 in inoperative position;

Figure 14 is a side elevational view of the alternative assembly shown in Figure 13 in operative position;

Figure 15 is a side elevational view of another alternative assembly of the assembly shown in Figure 2, in inoperative position;

Figure 16 is a bottom view of my assembly shown in Figure 15 as seen along the line 16—16 of Figure 15;

Figures 4, 5:
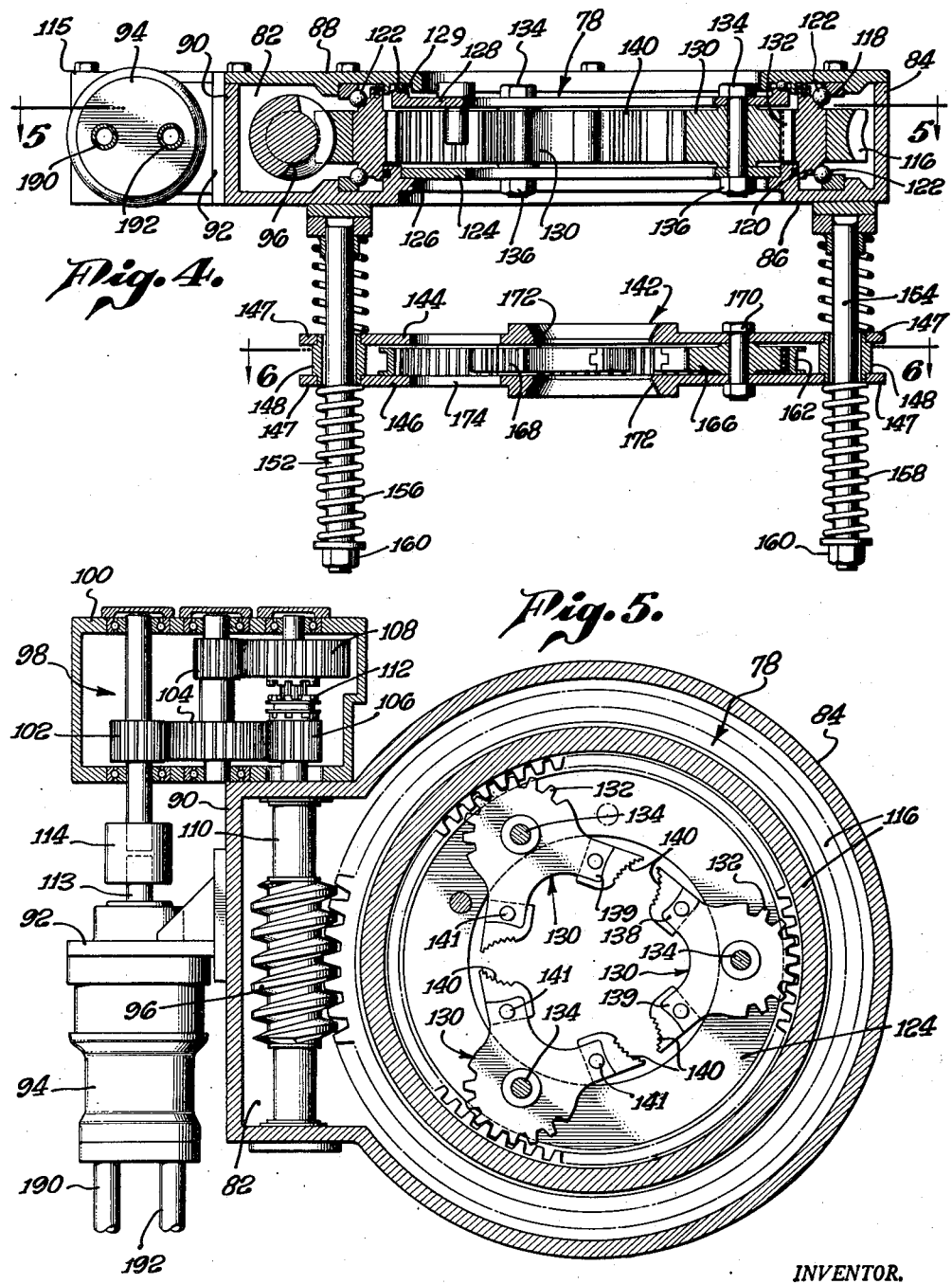
Figure 4 is a longitudinal, vertical, sectional view taken through the axis of the pipe aperture as seen along the line 4—4 of Fig. 3.
Figure 5 is a sectional view through the assembly as seen in the direction of the arrows 5—5 in Fig. 4.

Figure 17 is a fragmentary view partly in top plan and partly in section showing in full lines one of the pipe gripping assemblies at the instant of engagement with a pipe and showing in dot and dash lines the position of the pipe gripping assembly after being wedged into engagement with the pipe; and Figure 18 is a sectional view taken in the direction of the arrows along the line 18—18 of Figure 17.

As illustrated, there is provided a generally, rectangular, horizontal base or frame 10 consisting of longitudinal members 12 and 14, transverse connections 16 and 18 joining their respective ends, and an intermediate transverse member 20. the frame being fixedly or movably disposed with relation to the ground, as desired. Toward one end thereof there is located a cylindrical upright 22 provided with a series of angularly disposed feet 24 (four in number) serving to brace the upright upon a horizontal platform 26 which is supported upon the end cross piece 16 and intermediate cross piece 20 of the frame.

The upright 22 is composed of an inner, hollow, open-topped cylinder 28 provided with an aperture 30 near its base for the introduction of pressurized fluid therein. An elongated cap 32 is slidably mounted atop the cylinder and is threadedly attached at its lower end to a medially located tubular collar 34 circumposed on the cylinder 28 and thus simultaneously longitudinally slidable therealong together with the cap. Located within the cylinder is a snugly fitting piston 36 having an upwardly extending shank 38 terminating in an annular bearing disk 40 which is adapted for rotational registration with the inner face of the end of the cap 32.

In a terminal, circular recess formed within the upper mouth of the cylinder there is positioned a shank-engaging packing gland 42, while an annular casing 44 disposed about the lower portion of the cylinder 28 provides a fixed support for the slidable collar 34 when the latter is at its lower or retracted position, shown in Figure 2. By this construction, it will be seen that hydraulic fluid such as oil or the like introduced into the cavity of fixed cylinder 28 at aperture 30, will force upward the piston 36 together with attached cap 32 and collar 34 while at the same time permitting the last two to be rotated at will, any desired degree about the upright, as shown in Figure 1. Upon release of fluid pressure in the sliding cylinder, the weight of the elevated assembly will retract the connected members until the lower end of the collar again abuts against the upper edge of the casing 44. (See Figure 2.)

In this lower position the coupling 81 is ready to reecive the hoisting elevators (not shown), and the pipe 80 is supported by the slips (not shown).

Secured to the lower portion of the telescoping collar 34, a rigid horizontal bracket 46 is attached in turn to a pair of diverging, upwardly slanted struts 48 and 50, each of which fixedly supports on its outer end, a horizontally disposed cylindrical sleeve 52 and 54 within each of which sleeves is slideably and rotatively mounted a longitudinally reciprocable arm 56 and 58 of considerably greater length than the respective sleeve. The inner end of each arm is provided with an enlarged head or flanged nut 60 to thus limit travel of the arm within its sleeve, while the opposite end of the arm is integrally attached to the upper section of a vertically disposed, open topped cylindrical chamber 62 resembling a dash pot. Within the chamber is mounted a correspondingly shaped plunger 64 having a dependent, axially reduced stem 66 inserted partway within a helical spring 68 which latter has its fixed seat at the base of the chamber and bears against the botttom of the plunger at its other end. Helical springs 67 and 69 are disposed on arms 56 and 58 between cylindrical sleeves 52 and 54, and cylindrical chambers 62, for the purpose of urging arms 56 and 58 outwardly to cylindrical sleeves 52 and 54.

Atop each plunger 64 is mounted a generally U-shaped bearing support 70 and 72 adapted to journal therein the bearing ends 77 and 79, respectively, a pair of bearings 73 and 75. Bearings 73 and 75 are provided with bores 85 and 87, respectively, which are adapted to journal therein a pair of horizontally projecting trunnions 74 and 76 which support the upper gripping unit 78. By this construction, the position of an engaged pipe 80 need not be aligned with the upright 22 but may be held at an angle diverging considerably therefrom since the pipe, together with its engaging unit, can rotate on the horizontal axis of the trunnions and can also tilt longitudinally along this same axis, as best shown in Figure 8, by rotation of bearing ends 77 and 79 in their respective U-shaped bearing supports 79 and 72, since each plunger 64 is capable of independent vertical movement in its chamber while the plunger assemblies can, in turn, rotate on the axis of the extension arms 56 and 58. In addition, the whole unit can be adjusted vertically by the fluid controlled upright 22, and can be moved toward and away from the upright by the sliding extension arms 56 and 58.

The wrench assembly 78 which is carried by the trunnions 74 and 76, is located in a generally cylindrical housing having a rectangular recess 82 at one side thereof and formed of integral side 84 and bottom walls 86 with a flat top 88 bolted thereto, the top and bottom walls being centrally apertured in their annular sections to receive a vertical pipe 80 therethrough. The inner ends of trunnions 74 and 76 are integrally connection to side 84 of the wrench assembly 78, as best shown in Figures 1, 2, 3 and 8. Attached to the outer face of the side wall 90 of the rectangular portion 82 of the wrench housing is a projecting bracket 92 which supports a wrench-driving motor 94 of conventional construction. A horizontally disposed worm gear 96 located in the recessed section 82 of the wrench housing is operatively connected to the motor by means of an intermediate gear train 98 located in a rectangular container or gear box 100 which is affixed to the end of the worm housing, the gear train consisting of a driving pinion gear 102, an intermediate gear 104 and high 106 and low 108 speed gears journalled on the worm shaft 110 and alternately keyed thereto by an intermediate jaw clutch 112. The shaft of the driving pinion 102 is connected to the drive shaft 113 of the motor by a coupling sleeve 114 located outside the gear box, the latter unit being completed in turn by a cover plate 115 bolted thereon.

Rotatably mounted within the circular section of the housing 84 is a horizontally disposed ring gear 116 having inner and outer peripheral teeth of which the latter are engaged in driving relation by the worm 96. The ring gear is provided with a medial, annular rib on both its upper and lower faces, the respective ribs 118 and 120 being set in corresponding race ways formed in the top cover plate 88 and bottom housing wall 86 and supplied with ball bearings 122. Above and below the plane of the ring gear are located a pair of inwardly extending, annular, rotatable spacer plates, of which the lower 124 rests upon a ledge 126 formed by the inner periphery of the housing floor 86, while the upper spacer plate 128 is provided with an upwardly extending, annular rib 129 about its outer edge, which rib is received in a corresponding groove or race way cast in the housing cover and also supplied with ball bearings 122.

Between the two spacer plates 124 and 128 are pivotally mounted a series of circumferentially spaced, cam-like, pipe gripping jaws 130 (three in number) provided with mutilated gear teeth 132 disposed in engagement with the inner peripheral teeth of the ring gear 116. Each jaw is vertically traversed by a bolt or pivot pin 134 attached by nuts 136 to the opposite spacer plates and the jaws are further provided with a pair of inwardly diverging fingers 138 and 139 which fan out in the shape of a V. At the end of each finger is mounted an inwardly bowed, knurled or toothed engaging die 140 held in place by pin 141, shown in detail in Figures 7, 17 and 18, the curved face of the die 140 of finger 138 of each jaw 130 being oppositely mounted to the curved face of the die 140 of finger 139 of the same jaw, so that the dies 140 of fingers 138 of all of the jaws 130 can jointly engage a pipe for rotation in one direction while the dies 140 of fingers 139 of all of the jaws 130 are adapted to engage the pipe for contrary motion. The pins 141 are securely mounted in fingers 138 and 139, and pass through passages 145 in dies 140. Passages 145 are considerably larger diametrically than pins 141, so that dies 140 are loosely mounted in fingers 138 and 139. Thus pins 141 merely function as die keepers to keep dies 140 from falling out of their slots in the ends of fingers 138 and 139, and do not function to rigidly affix the dies to the fingers.

The action of these dies 140 is entirely novel and produces very beneficial results as will now be made apparent. Viewing the apparatus from the top as in Figures 3 and 5, clockwise rotation of the ring gear 116 causes clockwise rotation of jaws 130, thus forcing dies 140 of fingers 139 into contact with pipe 80. Dies 140 of fingers 139 grip pipe 80 integrally as said dies are moved into contact therewith, and thereafter during clockwise operative movement of pipe 80 dies 140 of fingers 139 move as a unit with pipe 80. But the fingers 139 move forward independently of the dies 140 mounted thereon after these dies have contacted pipe 80 until the necessary gripping position is reached.

The way that one of these fingers 139 moves with relation to the die 140 mounted thereon is as follows:

If die 140 was of uniform thickness there would thus be no wedging action. However, to render such a wedging action possible, die 140 is thicker at one end, 143 (see Figures 7 and 17), and therefore the movement of the surface 147 of finger 139 which contacts the rear surface 151 of die 140 over the rear surface 151 of die 140 has a wedging action by having the effect of wedging or camming the outer end of finger 139 farther away from the center of the gripped pipe 80, and thereby wedging the die tighter against the pipe 80 and closer to the center of pipe 80. Corresponding surfaces 147 and 151 are complementarily shaped and may be either flat or respectively convex and concave.

Figure 17 illustrates a pipe gripping jaw 130 in two positions relative to the pipe 80. The position illustrated in full lines is that which is occupied at the instant the pipe is engaged by the die 140 on the finger 139. Continued rotation of the ring gear 116 in clockwise direction will cause translation of the jaw 130 from the full line position to the position shown by the dot and dash lines. It will be seen that during this translation the die 140 on the finger 139 has not moved with the jaw 130 but that it has been wedged against the surface of the pipe 80. It will also be seen that the pin 141 in the finger 139 has moved from one end of the slot 145 toward the opposite end of that slot.

After the desired gripping position has been reached pipe 80, die 140 and its associated finger move clockwise thereafter as a unit until clockwise rotative force is no longer applied by ring gear 116.

Counterclockwise rotation of ring gear 116 causes counterclockwise rotation of jaws 130, thus forcing dies 140 of fingers 138 into contact with pipe 80. Counterclockwise rotation of the pipe 80 is effected in exactly the same manner as clockwise rotation, except that dies 140 of fingers 138 grip and move pipe 80 instead of dies 140 of fingers 139.

In this way a large portion of the circumference of pipe 80 is engaged by dies 140 my dies 140 gripping and positively engaging as much as forty (40%) percent of the circumference of pipe 80. Thus pressure is spread out over more of the pipe wall and crimping of the pipe is reduced to a minimum by this equalizing of the pressure.

A further advantage gained by my invention is that the pipe 80 is centered at all times so that the center of pipe 80 is equi-distant from each of the three pivot pins 134 in the make-up unit 78 and from each of the three pivot pins 170 in the back-up unit 142. This is accomplished in the following manner:

Each of the fingers 138 and 139 rides up the back of its die 140 against the wedge caused by the thickness 143 on the pipe gripping face of the die 140 a certain distance, namely far enough to cause the finger 138 or 139 to move as a unit with its die 140 and pipe 80. This distance may vary in all of the dies, due to differences in thickness and contour of pipe 80, and thus all variations in pipe 80 are accommodated by these wedges 143. In this way pipe 80 is always centered and the pivot pins 134 always rotate in circles whose center is the same as the center or axis of the pipe when pipe 80 is being rotated.

Also the full face of each die 140 is always flush with the entire part of pipe 80 which it engages due to the universal mounting of the make-up case in opposed pairs of trunnions or roller bearings, 70, 72, 74 and 76. By these opposed pairs of roller bearings the make-up case can follow any deviation of the pipe 80 from the vertical and thus the make-up case, and hence the faces of all of the dies 140, are always at right angles to the axis of pipe 80.

The beneficial result obtained by thus always maintaining the dies 140 flush with pipe 80 is that the pressure of the tongs against the dies is always evenly distributed over the entire face of each of the dies 140 and the dies never bite into the pipe more at one point than at another. Thus these dies further help to minimize or eliminate crimping of the pipe by always being flush with the pipe due to this universal mounting .

Also lateral movement of pipe 80 with or without tilting is always followed by the case and dies due to the apparatus employed for mounting and suspension shown and described herein, which includes the horizontally pivotal mounting of collar 34 on upright 22 and the horizontally slideable mounting of arms 56 and 58 in sleeves 52 and 54.

Upon the jaws firmly gripping the pipe 80 (Figure 2) by reason of articulation of the inner teeth of the ring gear 116 with the gear teeth 132, the gripping jaws, pipe, and spacer plates are then rotated in unison, by further rotation of the ring gear in the same direction, driven by the worm 96.

Located beneath this wrench assembly 78 is a second gripping unit 142, rotatable with the upper unit 78 and vertically adjustable in relation thereto, so as to accommodate a pair of pipe sections being coupled or uncoupled while suspended between the respective gripping units. The lower unit consists of a pair of horizontally disposed, centrally apertured, fixed disks 144 and 146 each having extending ears 147 which are mounted on opposite ends of vertically positioned tubular spacers 148 the latter being longitudinally traversed by dependent rods 152, 153, and 154 secured to the under surface of the wrench housing 86. Below the jaw assembly 142, a helical spring 156, 157 and 158 is disposed about each rod 152, 153 and 154 with its upper end bearing against the lower disk 146 and its lower extremity seated against a flanged nut 160 threadedly mounted on the bottom of the respective rod. Similarly, above the jaw assembly 142 a helical spring 155 is disposed about each rod 152, 153 and 154 with the extremities of said springs seated to give resilience above the jaw assembly 142.

Rotatably mounted between the disks 144 and 146 is a horizontally disposed, internally toothed, ring gear 162 having a laterally extending operating arm 164 projecting therefrom. Ring gear 162 may either be mounted similarly to ring gear 116 of upper gripping unit 78, or it may merely be seated against the top of disk 146 as shown in Figure 4. Ring gear 162 will not move out of its path of rotation because of its contacts with outer cam teeth 167. Arm 164 is alternately actuated to rotate the ring gear 162 in opposite directions by a piston rod 161 attached to a piston 163 which is reciprocally mounted in a cylinder 165. Cylinder 165 is pivotally connected between disks 144 and 146 of lower jaw assembly 142 near the peripheries of disks 144 and 146.

The piston 163 is part of the hydraulic system shown particularly in Figures 3, 6 and 9.

This hydraulic system utilizes fluid from a reservoir (not shown) to actuate the lifter leg assembly (Figures 1 and 2), the worm motor (Figure 5) and the backups or lower gripping unit 142 (Figures 6 and 9).

To actuate the lifter leg assembly fluid from the reservoir is drawn through line 176, three-way valve 178 and line 180 to aperture 30 in cylinder 28. To lower the lifter leg assembly fluid is withdrawn from aperture 30 through line 180, three-way valve 178 and return line 182 to the reservoir.

Actuation of the three-way valve 178 is effected by manipulation of lever 184. When lever 184 is in it connects lines 176 and 180 and thereby lets fluid under pressure from the reservoir go into aperture 30 to raise the lifter leg assembly. When, conversely, lever 184 is out it connects lines 180 and 182 and thereby draws fluid out of aperture 30 into the reservoir to lower the lifter leg assembly.

To actuate the worm motor fluid from the reservoir is fed through line 186, four-way valve 188 and line 190 to worm motor 94 to rotate the worm gear in one direction, the fluid returning to the reservoir through lines 192 and 194. To rotate the worm gear in the opposite direction fluid is fed to the worm motor 94 through line 186, four-way valve 188 and line 192 from the reservoir and returned to the reservoir through lines 190 and 194.

Actuation of the four-way valve 188 is effected by manipulation of lever 196. When lever 196 is in it connects lines 186 and 190 and thereby admits fluid under pressure from the reservoir into worm motor 94 to actuate its ring gear in a clockwise direction. When, conversely, lever 196 is out it connects lines 186 and 192 and thereby feeds fluid into worm motor 94 from the reservoir to actuate the worm motor's ring gear in a counter-clockwise direction.

Synchronous actuation of the backups or lower gripping unit 142 is effected when lever 196 is manipulated by connecting the cylinder 165 on opposite sides of piston 163 with the lines to the worm motor 94. Line 198 connects line 190 with the part of cylinder 165 that is on the side of piston 163 that is opposite piston rod 161. Line 200 connects line 192 with the part of cylinder 165 that houses piston rod 161. Thus when fluid is fed from the reservoir through line 190 to worm motor 94 to drive the upper gripping unit 78 in a clockwise direction fluid also flows along line 198 to cause piston 163, piston rod 161 and arm 164 to effect counter-clockwise rotation of ring gear 162 of lower gripping unit 142. When, on the other hand, fluid is fed to worm motor 94 through line 192 to drive the upper gripping unit in a counter-clockwise direction fluid is also fed through line 200 to the piston-rod side of cylinder 165 to effect clockwise rotation of ring gear 162. In this way, by these means the lower gripping unit 142 is always automatically set at a position opposed to the upper gripping unit 78 by the mere operation of manipulating valve 196.

A series of pipe gripping jaws 166, similar to jaws 130 above, are pivotally mounted between the two disks with their outer cam teeth 167 disposed in engagement with the internally projecting teeth of the ring gear 162. Each jaw is provided with a pair of inwardly diverging fingers having an inwardly bowed, toothed or serrated gripping end 168 and 169, one or the other of the pair of fingers of each jaw being adapted to engage the pipe 80 in binding relation by movement about its pivot pin 170. Disks 144 and 146 are provided with central passages to receive the drill pipe. The two disks are each outwardly flanged adjacent said central passages to provide raised portions of the disks as shown in Figure 4, and said central passages are beveled so as to provide a guide way 172 for a pipe or coupling inserted therethrough, from either side, while, in addition, each disk may be accurately slotted or apertured between the jaw pivot pins 170, as at 174.

It will thus be seen that by rotating the lower ring gear 162 in one direction or the other by actuating the arm 164, the pipe 80 will be grasped by the one set of fingers 168 or 169, respectively, and held to prevent rotation of the pipe against the angular alignment of the gripping teeth. The fingers 138 or 139 of the upper wrench assembly 78 are then moved against their adjacent pipe section by actuation of the worm gear 96. Continued actuation of the worm gear 96 after the fingers 138 or 139 contact the pipe 80 causes the fingers 138 or 139 and the pipe 80 to be driven in counter direction to the lower engaging fingers 168 or 169 to screw or unscrew the upper pipe segment as the case may be. To reverse the action, it is necessary only to manually operate the lever 196 on the four-way valve so as to extend the opposite engaging fingers (168 or 169) and then drive the worm gear in a contrary direction. The lower gripping assembly 142 supported by the resilient coils 156, 157 and 158 will automatically travel up or down the vertical suspension rods 152, 153 and 154 as required in inserting or withdrawing a pipe section from a coupling joint.

The cases of the make-up (78) and back-up (142) units are the reaction members against which the rotation of the ring gears 116 and 162 is effected.

The beneficial result that is obtained by this utilization of the reaction forces is that neither the make-up case nor the back-up case is braced against the ground and therefore both units can be suspended in the air in operative position without any brace or rope, i. e., neither compressive nor tensile, reaction bracing.

This is also a great safety factor as there is no back-up line in my tongs. In prior tongs the back-up line, or tensile reaction member was, liable to snap and cause the back-up tongs to violently spin around the pipe, often resulting in killing or injuring someone.

In the variation of my invention shown in Figures 15 and 16 the reaction force is transmitted from the make-up case through the lifter leg and hand tongs to the pipe and spider and slips which furnish the reaction force for the back-ups in this variation.

Figure 10:
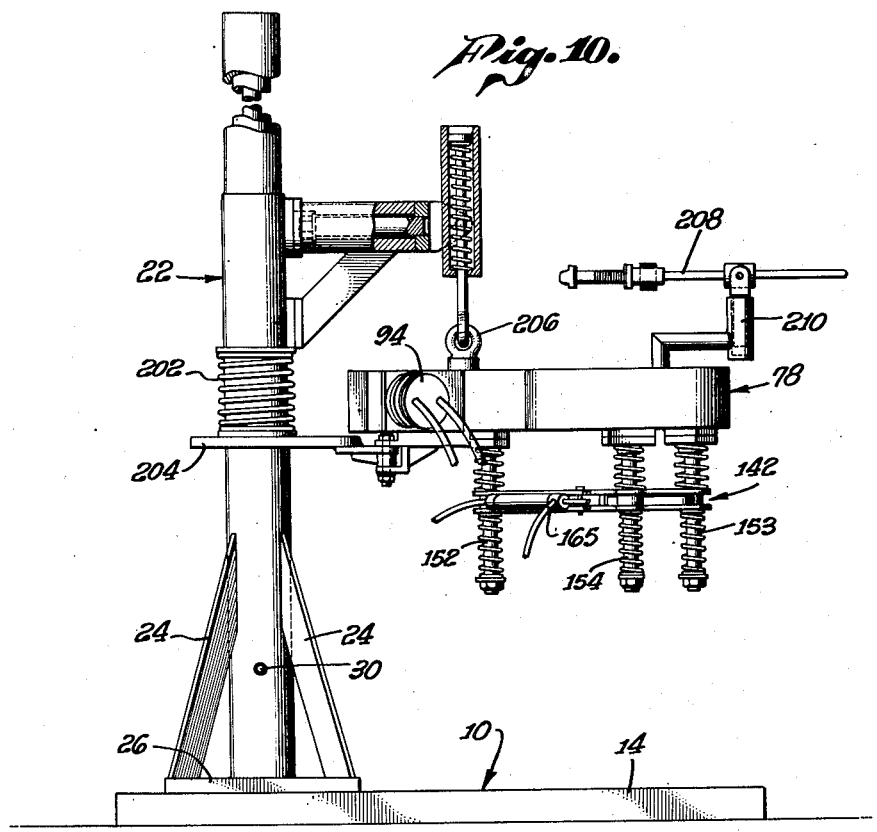
Figure 10 is a side elevational view of an alternative assembly of the assembly shown in Fig. 2, with an added attachment for assembling and disassembling couplings in a string of pipe.
Figure 11:
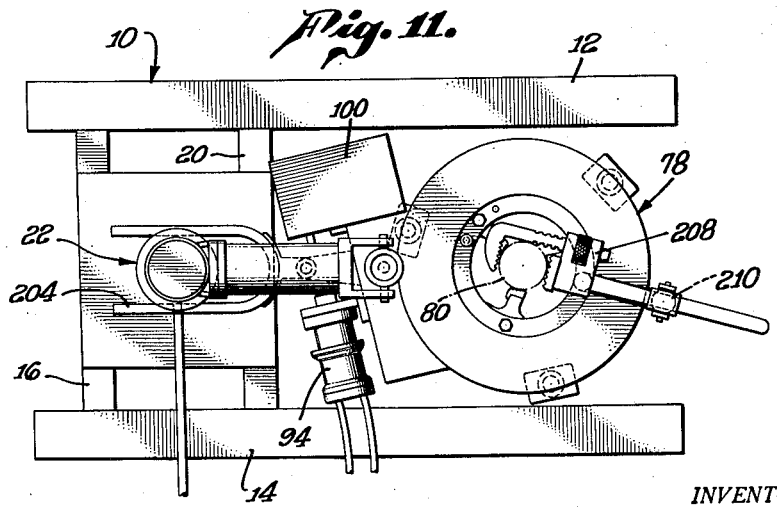
Figure 11 is a plan view of the assembly shown in Fig. 10 in operative position of the added attachment.

Figures 10 and 11 show an alternative embodiment of my invention in which the tongs are suspended from the top instead of from the bottom as in the embodiment shown in Figures 1, 2 and 3. An advantage of this embodiment shown in Figures 10 and 11 is that the tongs "center" more easily and work better. This embodiment employs cylindrical upright 22 with an elongated cap and associated tubular collar, similar to cap 32 and collar 34 of my preferred embodiment, slideably mounted over an upwardly slanting strut similar to one of struts 48 and 50 of my preferred embodiment helps provide rigidity to a tubular member integrally connected to and horizontally extending from the collar similar to collar 34. A cylinder containing a spring which abuts against the bottom thereof and an associated plunger is integrally attached to an arm similar to arms 56 and 58. This arm is slideably and rotatably mounted in said tubular member. Spring 202 and yoke 204 stabilize the tongs which are suspended on the lower end of said plunger at 206 in such a manner that there is more weight to the right of point 206 in Figure 10 than to the left of point 206. This construction causes the yoke 204 to move up against spring 202 and thereby the tongs are kept level by making the spring 202 strong enough to offset the overbalance. This construction leaves room for the hoisting elevators (not shown) to latch and unlatch above the tongs.

An added attachment consisting of a pipe wrench 208 mounted on a vertical post 210 is for screwing up and unscrewing couplings when it is necessary to replace the couplings in the string. This can be done with the embodiment shown in Figure 1 but it entails changing dies and this involves too much time and trouble. This attachment 208 is completely portable and is removed when not needed. It is much easier and simpler than changing the dies in the make-up assembly.

Figure 12 shows still another embodiment alternative to that shown in Figures 1 and 2. The structure shown in Figure 12 is suspended from above like that of Figures 10 and 11 instead of being supported like the embodiment shown in Figures 1 and 2. However the embodiment shown in Figure 12 is suspended by a cable 212, which may be operated by a sand line drum (not shown), or by a cathead (not shown), or by a weight box (not shown), or by fluid pressure against a piston having a piston rod connected to cable 212, which is slideably mounted in cylinder 214 as shown in Figure 12.

Also three legs, 216, are integrally attached to and extend downwardly from disk 146 of lower gripping unit 142. Legs 216 rest on the ground or floor in order to line hold the embodiment of Figure 12 in inoperative position, when there is little or no tension on cable 212, and they are lifted to operative position as integral parts of lower gripping units 142 when the tongs are raised by the cable 212. These legs 216 take the place of collar 34 in Figure 2 which rests on casing 44.

Figures 13 and 14 show another alternative assembly to that shown in Figures 1 and 2. Figure 13 shows this alternative in the inoperative position with the extensions 218 of dependent rods 152 resting in the supporting sockets 220 which are integrally attached to a brace member. A spider 221 is also provided. Figure 14 shows this embodiment in the operative position with the extensions 218 of dependent rods 152 idly supported above the empty sockets 220. A cable 212 supports this assembly in the same manner that the embodiment of Figure 12 is supported, bails 222 and 224 providing four points from which the tongs are suspended.

When the tongs shown in Figures 13 and 14 are in inoperative there is a double guide ring like 172 in Figure 4 for the pipe 80 to move through when the pipe is slid through lower gripping unit 142. This double guide ring is rigidly braced by the tongs resting with legs 218 in holders 220 as shown in Figure 13. This guides the pipe when it is passing through the tong assembly into or out of the hole of the oil well.

There are three such double guide rings in this assembly, one in the spider, one in the make-up unit and one in the back-up unit.

These guide rings keep the pipe better centered than a single guide ring would do as they do not serve as a fulcrum for tilting the pipe as does a single guide ring.

A coupling coming up may hit the guide ring (like 172 in Figure 4) in the spider 221 in Figure 13, which is integrally connected to the above mentioned base member that is setting loosely on the derrick floor. This may move the spider 221, together with its attached base member, laterally. The tongs are resting in the sockets 220 which, together with the spider (Figure 13) 221, are integrally connected to the said base, so they move laterally with the spider and so all the centering rings move integrally laterally as a unit and thus the centering rings keep the tongs centered.

Figures 15 and 16 show another alternative assembly to that shown in Figures 1 and 2.

A post 226 and brace 227 support a wheel 228 over which supporting cable 212 is run, with weight 214 on one end and the tong assembly on the other, thus effecting a suspension similar to the assembly shown in Figure 12.

Wheel 228 is mounted on fork 229, which is mounted in post 226 so it can rotate on its thrust bearing 231, which is mounted on a shoulder in post 226. This rotation swings the tong out of the way of the well head when desired.

Rollers 230, mounted on ball bearings and preferably three in number and opposed, facilitate the raising and lowering of the assembly on the post 226. Supports 222 and 224 are like Figures 13 and 14 only they are connected to horizontal arm 232.

Only two extensions 218 and sockets 220 are used and spider 221 is also provided.

J-shaped guides 234 (four in number) are attached to the bottom 86 of make-up case 70 to center the tongs on the pipe. A hand wrench (not shown) serves as a back-up member for the first few sections of pipe. After that the weight of the pipe itself performs this function and renders it unnecessary to use hand tongs for back-ups.

One of the principal features of the assembly shown in Figures 15 and 16 is the provision of a direct driven flexible shaft 236 (see Figure 16) which is connected to the driving pinion gear 102 in gear box 100 in place of motor drive shaft 113, coupling sleeve 114 and motor 94 shown in Figure 5, which are eliminated in this assembly.

This is the most simplified assembly shown in the accompanying drawings, as it eliminates the hydraulic drive shown in Figure 5 as explained above and also it eliminates the back-ups or lower gripping unit 142, thus greatly reducing the cost and the weight of the tong assembly. The flexible drive has a motor 237 and a conventional combination clutch and reverse gear 238 with a single speed forward, and it is equipped with a torque meter 240 to measure the torque delivered to the threads of the pipe.

While I have shown and described in some detail several presently preferred embodiments of my reversible pipe-coupling wrench, it is to be understood that various modifications may be made in the construction and operation thereof within the scope of the subsequently claimed invention.

I claim:

1. A pipe wrench assembly including a pair of pipe gripping units, coupling means for holding said units in axially spaced relation to each other, a plurality of pipe gripping elements pivotally mounted in each of said units, the several elements of each of said units being jointly operable to selectively engage and disengage a pipe against rotation in either direction, a reversible fluid driven worm motor operable to jointly operate the several elements of one of said units, a reversible fluid operated piston in a cylinder operable to jointly operate the several elements of the other of said units, a source of fluid pressure and fluid lines and valve mechanisms to selectively simultaneously admit fluid pressure from said source to the respective opposite sides of said worm motor and said piston, whereby said units always are substantially simultaneously urged in opposite directions from each other in order to make or break a pipe joint.

2. A pipe wrench assembly including a reversible source of rotary power, a ring gear, a drive connection between said source of power and said ring gear, a pivoted pipe gripping member rotatable on its pivot by said ring gear and a pair of pipe gripping dies mounted on said pipe gripping member, said dies being disposed on opposite sides of a line between the axis about which said pipe gripping member is pivoted and the central axis of a pipe which is to be gripped by said pipe gripping dies.

3. A pipe wrench assembly including a gripping unit having a pipe-receiving passage therethrough, a plurality of pipe-gripping elements, each of which includes a pair of gripping surfaces operatively facing in opposite pipe-gripping directions, mounted in said unit, means for substantially, simultaneously rotating said unit and pivoting said elements in one direction and means for substantially, simultaneously rotating said unit and pivoting said elements in the opposite direction.

4. A pipe wrench assembly including a pivoted pipe-gripping element, means for pivoting said element and a pipe-engaging die having non-parallel pipe-engaging and rearward faces sufficiently loosely mounted on said element to permit said pipe-engaging face to be wedged into and out of pipe-engagement with a pipe when said pipe-engaging face is in operative engagement with a pipe.

5. A pipe wrench assembly including a pivoted pipe-gripping element having a forward face and a pipe engaging die having non-parallel pipe-engaging and rearward faces loosely mounted on said element with said rearward face disposed adjacent to said forward face, said forward and rearward faces substantially coinciding.

6. A pipe wrench assembly including a gripping unit having a pipe-receiving passage therethrough, a die finger carrier ring disposed about said passage and rotatably mounted in said unit, means for rotating said ring in a forward direction, a plurality of die holding fingers pivotally mounted on said ring and extending in a direction forward of the center of said passage, a cam surface on the end of each of said fingers, a pipe-engaging die having a pipe-engaging front face and a rear face loosely mounted on the end of each finger so that said rear face and said forward cam surface are complementary and disposed adjacent to one another, the distance between said faces being greater at one end of each die than at the other end and the end of each die having this greater face separation being the forwardmost end of the die when said fingers and said dies are in the pipe-engaging position and means for simultaneously pivoting said fingers.

7. A pipe wrench assembly including a gripping unit having a pipe-receiving passage therethrough, a gripping element carrier ring disposed about said passage and rotatably mounted in said unit, means for alternately rotating said ring in opposite directions, a plurality of pipe-gripping elements pivotally mounted in said unit, each of which individually comprises a bifurcate jaw, a cam surface on the end of each furcation of said gripping elements, a pipe-engaging die having a pipe-gripping front face and a rear face loosely mounted on the end of each of said furcations so that said rear face and said forward cam surface are complementary and disposed adjacent to one another, the distance between said faces being less at one end of each die than at the other end and the ends of the two dies on each gripping element having this lesser face separation extending generally toward each other, and means for alternately pivoting all of said gripping elements in either direction.

8. A pipe wrench assembly, including a base member, a laterally extending supporting arm affixed to said base member, a gripping unit, a plurality of pipe-gripping dies mounted in said gripping unit, a normally substantially vertically disposed pipe-receiving passage through said gripping unit and a universal joint operatively interconnecting said gripping unit and said supporting arm, said universal joint including a pair of substantially horizontal pivoting axes disposed at substantially right angles to one another.

9. A pipe wrench assembly including a pivoted pipe-gripping element having a forward face and a pipe engaging die having non-parallel pipe-engaging and rearward faces loosely mounted on said element with said rearward face disposed adjacent to said forward face, said forward and rearward faces being respectively concave and convex and substantially coinciding.

10. A pipe wrench assembly including a gripping unit having a pipe-receiving passage therethrough, a die finger carrier member disposed about said passage and rotatably mounted in said unit, means for rotating said carrier member in a forward direction, a plurality of die holding fingers pivotally mounted on said carrier member and extending in a direction forward of the center of said passage, a concave forward cam surface on the end of each of said fingers, a pipe-engaging die having a pipe-engaging front face and a convex rear face loosely mounted on the end of each finger so that said rear face and said forward cam surface are complementary and disposed adjacent to one another, the distance between said faces being greater at one end of each die than at the other end and the end of each die having this greater face separation being the forwardmost end of the die when said fingers and said dies are in the pipe-engaging position, and means for simultaneously pivoting said fingers.

11. A pipe wrench assembly including a gripping unit having a pipe-receiving passage therethrough, three die holding fingers, each having a forward cam surface, pivotally mounted in said unit at regular intervals around said passage, means for pivoting said fingers and a pipe-engaging die having a pipe-engaging face and a rearward face loosely mounted on the end of each finger, the distance between said faces being greater at one end than the other end of said faces and said forward cam surface and said rearward face being complementary and disposed adjacent to one another.

12. A pipe wrench assembly including a reversible source of rotary power, a ring gear, a drive connection including a flexible shaft between said source of power and said ring gear, a pivoted pipe-gripping member rotatable on its pivot by said ring gear and a plurality of pipe-gripping dies mounted on said pipe-gripping member, said dies being disposed on opposite sides of a line between the axis about which said pipe-gripping member is pivoted and the central axis of a pipe which is to be gripped by said pipe-gripping dies.

13. A pipe wrench assembly including a ring gear, a reversible fluid-driven motor operatively connected to said ring gear to drive said ring gear in either direction, a pivoted pipe-gripping member rotatable on its pivot by said ring gear and a pair of pipe-gripping dies mounted on said pipe-gripping member, said dies being disposed on opposite sides of a line between the axis about which said pipe-gripping member is pivoted and the central axis of a pipe which is to be gripped by said pipe-gripping dies.

DAVID R. CORMANY.

References Cited in the file of this patent

UNITED STATES PATENTS

| Number | Name | Date |
|---|---|---|
| 375,155 | Haynes | Dec. 20, 1887 |
| 614,333 | McCready | Nov. 15, 1898 |
| 1,076,379 | Lebus | Oct. 21, 1913 |
| 1,200,612 | Helm | Oct. 10, 1916 |
| 1,511,850 | Thrift | Oct. 14, 1924 |
| 1,519,175 | Trew | Dec. 16, 1924 |
| 1,617,509 | Thrift | Feb. 15, 1927 |
| 1,644,470 | Greve | Oct. 4, 1927 |
| 1,774,752 | King | Sept. 2, 1930 |
| 1,811,666 | Foster | June 23, 1931 |
| 1,845,389 | Baash et al. | Feb. 16, 1932 |
| 1,902,216 | Buttress | Mar. 21, 1933 |
| 2,000,221 | Dawson | May 7, 1935 |
| 2,108,971 | Olsen et al. | Feb. 22, 1938 |
| 2,181,641 | Hicks | Nov. 28, 1939 |
| 2,190,547 | Le Bus | Feb. 13, 1940 |
| 2,263,267 | Franklin | Nov. 18, 1941 |
| 2,317,306 | Smith | Apr. 20, 1943 |
| 2,405,757 | Rowland | Aug. 13, 1946 |
| 2,450,934 | Calhoun | Oct. 12, 1948 |
| 2,509,853 | Wilson | May 30, 1950 |
| 2,556,536 | Harris | June 12, 1951 |
| 2,566,561 | Edelberg | Sept. 4, 1951 |